United States Patent [19]

Stahl

[11] 4,264,201

[45] Apr. 28, 1981

[54] ELECTROSTATIC COPYING PROCESS

[75] Inventor: Harold M. Stahl, Ridgefield, Conn.

[73] Assignee: Pitney Bowes Inc., Stamford, Conn.

[21] Appl. No.: 960,000

[22] Filed: Nov. 13, 1978

[51] Int. Cl.[3] .............................................. G03B 27/32

[52] U.S. Cl. .................................... 355/77; 355/14 E; 355/16; 430/31

[58] Field of Search ............. 355/3 R, 3 CH, 7, 14 E, 355/16, 77; 430/31

[56] References Cited

U.S. PATENT DOCUMENTS

| | | | |
|---|---|---|---|
| 3,540,806 | 11/1970 | Starkweather | 355/11 X |
| 3,788,737 | 1/1974 | Kidd | 355/7 X |
| 3,792,913 | 2/1974 | Simmons | 355/3 R X |
| 3,860,338 | 1/1975 | Reehil | 355/7 X |
| 4,105,321 | 8/1978 | Urso | 355/3 CH |

*Primary Examiner*—Fred L. Braun
*Attorney, Agent, or Firm*—Peter Vrahotes; William D. Soltow, Jr.; Albert W. Scribner

[57] ABSTRACT

In an electrostatic xerographic copying process and apparatus in which a photoconductive insulating master is sensitized by application of a uniform electrostatic charge to the photoresponsive surface thereof, the charge is removed in non-image areas by exposure to a light image corresponding to the non-image areas of an illuminated original to leave charged latent image areas capable of development with coloring material. The sensitized photoreceptive surface is pre-exposed to an electroluminescent element of sufficient intensity to completely or partially remove the charge from all areas or some areas of the surface prior to the exposure to the light image. Complete removal of the charge is advantageous in spaced transverse portions of a continuous master which are not to be exposed to the illuminated original sheet, thereby desensitizing such areas. Partial removal of the charge is advantageous in the case of masters having slow photoresponse, which can be overcome by reducing the surface potential thereof.

9 Claims, 3 Drawing Figures

ELECTROSTATIC COPYING PROCESS

BACKGROUND OF THE INVENTION

The xerographic copying process is based upon the fact that certain photoconductive insulators or photoreceptors will accept and hold an electrostatic charge in the dark and will release or dissipate said charge in areas which are exposed to light. Moreover, such elements will release or dissipate their charge at a rate which is proportional to the intensity of the light to which they are exposed, whereby portions of the charged surface which are exposed to light reflected by black or nonreflective imaged areas of an imaged original sheet will retain a strong electrostatic charge, portions exposed to light reflected by grey or semi-reflective imaged areas of an image original sheet will retain a weaker electrostatic charge having an intensity proportional to the degree of reflection and portions exposed to light reflected by white or background will retain little or no electrostatic charge, insufficient to attract or hold toner powder to such portions.

The exposed photoreceptive surface retains latent electrostatic image areas of different intensities having different affinities for oppositely-charged developer powders or liquids. The charged image areas attract different amounts of the developer powder or toner, in proportion to the strength of the charges present, to produce developed image areas which may vary in tone between light grey and dark black to correspond with the imaged areas of the original sheet. Finally the toner images are heatfused to render them permanent, the toner powder containing a heatfusible resinous binder material.

There are many variations of the xerographic copying process. The photoconductive insulating surface may be the surface of a selenium drum, a photoreceptive plastic belt, a photoreceptive coated master web or photoreceptive coated paper sheets. The latent electrostatic images may be developed with toner directly on the photoreceptive surface or the latent images may be transferred to a copy sheet and thereafter developed and heat-fused on the copy sheet. Also, the photoreceptive surface may be present on the final copy sheet so that the latent images are toned and heat-fused thereon to produce the actual copy.

Among the problems encountered with some of the known electrostatic copying processes are the problems of (a) non-uniform photoresponsive sensitivity of the photoconductive insulating surface and (b) interdocument development. The first problem arises from the fact that certain photoconductive insulating surfaces, particularly where such surfaces comprise photoreceptive coatings on paper master webs or sheets, have dielectric or insulating properties which may vary from one master web to the next or from one batch of master sheets to the next. In certain cases the dielectric or insulating properties of the master web or sheet are so great that the photoresponse of the master is too slow, i.e., the photoconductive surface does not release or dissipate the electrostatic charge at a satisfactory rate or speed under the effects of light reflected from an imaged original sheet. In some cases this results in copies having a poor grey scale, i.e., areas which should be lighter than others on the copy sheet are not lighter because the master did not dissipate sufficient electrostatic charge from such areas. In other cases even the background areas of the master retain a sufficiently-strong electrostatic charge that they attract the toner powder to such areas to produce copies having various amounts of developed toner in the form of specks and spots in the non-image background areas.

The second problem, namely interdocument development, occurs in processes which use a charged photoreponsive surface which is longer than the area of said surface which is exposed to the illumnated original sheet. The unexposed areas of the master retain the electrostatic charge and attract toner powder to form transverse black stripes between the copies. This wastes toner powder and produces unsightly black margins at the top and/or bottom of the copies formed, which margins generally are cut away and discarded. Moreover, the heavy deposits of toner formed on the unexposed areas of the photoresponsive surface of the master, and which are not transferred to the copy sheet, must be cleaned from said surface before those areas of the master can be reused. Obviously, such heavy deposits contaminate the cleaning brushes of the copying machine.

The problem of interdocument development can be overcome by limiting the charged areas of the photoreceptive surface to correspond to the length of the original sheets being copied. However, this requires the intermittent operation of the corona discharge element and the repeated activation/deactivation of said device, as occurs for instance when several copies of the same original are being made or when a rapid succession of different copies are being made, can result in a premature breakdown of the corona discharge device resulting from breakage of the charger wires.

The problem of interdocument development can also be overcome by removing the electrostatic charges from the photoreceptive surface in areas between copies by exposing said areas to the light source, i.e., as the continuous charged photoreceptive web is moved into and out of the exposure station, the leading and trailing edges, which are beyond the length of the web actually exposed to the illuminated original sheet being copied, may be exposed to a light source to remove the electrostatic charge from said areas. However, a conventional incandescent or flourescent lamp cannot be turned on and off with sufficient rapidity to remove the electrostatic charge from the interdocument areas of the moving photoresponsive web without interfering with the charge in the areas of the web corresponding to the copies to be made. Thus, when the light is turned off at the leading edge of each intended copy length of the web, the after-glow will remove or reduce the charge near the top of the intended copy length of the web. When said copy length is exposed to an illuminated original sheet having images near the top thereof, said images are not reproduced or are only weakly reproduced on the photoresponsive web since the electrostatic charge has already been removed wholly or in part from said areas of the web. Conversely, when the interdocument area of the web beyond the intended copy area is to be exposed to light source, the slight time lapse between activation of the light source and full illumination results in an incomplete removal of the electrostatic charge from the area of the web just beyond the intended copy area whereby said area remains receptive to the imaging toner and develops a black border at the bottom edge of each copy.

Another problem encountered with xerographic copying machines using magnetic carrier particles for the toner powder is the problem of carry-out of the magnetic carrier particles whereby such particles are attracted to the charged surface of the master and transfer thereto with the toner powder. The cause of this problem is complex but the problem is magnified in cases where the surface potential of the photoresponsive surface of the master is unduly high. The transferred magnetic particles may degrade the quality of the copies produced, may scratch the photoresponsive surface of the master and/or may deposit in the mechanism of the apparatus, causing premature wear.

SUMMARY OF THE INVENTION

The present invention is based upon the discovery that the problems of non-uniform master photoresponse and/or interdocument development can be overcome by exposing the charged master to an energized electroluminescent element having the required intensity prior to the exposure of the web to the illuminated original.

In the case of interdocument development, the charged areas of the web lying between the intended copy areas, or charged web areas not exposed to the illuminated original, are exposed to the electroluminescent element which is energized to a sufficiently high degree to remove or dissipate the electrostatic charge from said areas to the extent that said areas are not receptive to the toner material, said electroluminescent element being a solid state element capable of instantaneous responsive to energization and de-energization to confine the removal of the electrostatic charges to the interdocument areas of the photoresponsive web.

According to a preferred embodiment of the present invention, a method and apparatus are provided which include the use of an electroluminescent element of variable intensity and means for varying said intensity between high limits, to prevent interdocument development, and low limits, to provide uniform photoresponsive properties in the photoconductive insulating surface of the master.

An advantage of the present invention with respect to xerographic copying machines employing a two component developer system comprising magnetic particle toner carrier composition involves the reduction of the surface potential of the master and a consequent reduction in the amount of magnetic carrier particles transferred to the master surface.

BRIEF DESCRIPTION OF THE DRAWING

The objects and advantages of the present invention will be apparent to those skilled in the art in the light of the present disclosure including the drawing which.

DETAILED DESCRIPTION OF THE DRAWING

Figure 1:
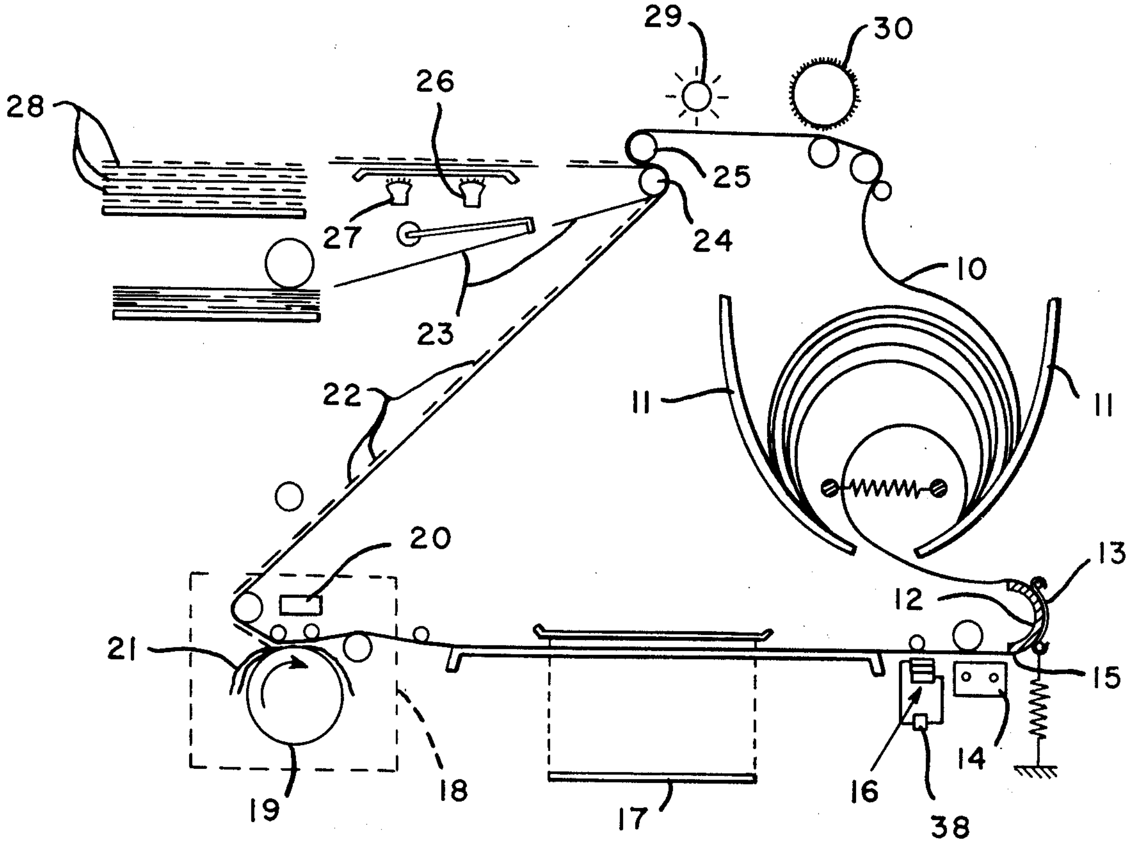
FIG. 1 is a diagrammatic cross-sectional view of a portion of an electrostatic copying machine illustrating the continuous path of the photoresponsive master web and the different operations carried out in connection therewith.

FIG. 1 illustrates the use of the novel electroluminescent elements of the present invention in an electrostatic copying apparatus of the type illustrated by U.S. Pat. No. 4,051,986, the disclosure of which is incorporated herein by reference.

As shown in FIG. 1, the continuous, folded photoresponsive master web 10 is dispensed from container hopper 11, passes between guide element 12 and brake element 13 and is drawn into the charging station and across the electrostatic charging device 14 with the photoresponsive surface 15 of the web 10 in close proimity to the charging device 14. The energized charging device 14 produces a potential of negative 500 volts over the entire photoreceptive surface 15. The continuously-moving charged web then passes into the pre-exposure station and over and in close proximity to the energized electroluminescent element 16 which is connected to a variable source of alternating current which supplies the element 16 with a timed sequence of high and low frequency current to vary the intensity with which the element 16 is caused to glow. According to the illustrated embodiment, the electroluminescent element 16 is continuously energized alternately by high and low frequency current in time sequence so that the element functions as both an interdocument charge eraser and as a photoresponse compensator in the predetermined areas of the master.

After illumination by the electroluminescent element 16, the web enters the exposure station where spaced areas of the length thereof are exposed to the flash reflection 17 of a strobe-illuminated original sheet. The electrostatic charges are dissipated and reduced or removed from the exposed areas of the photoreceptive surface 15, in proportion to the degrees of reflected illumination received from the different areas of the original sheet.

Thereafter the moving exposed web enters the development station 18 into close proximity with the application roller 19 and under magnet 20. The developer composition 21 comprises a mixture of fine magnetic particles and a minor amount of heat-fusible toner power which is carried by the magnetic particles but which has a greater affinity for the electrostatic charges remaining on the photoreceptive surface 15. Application roller 19 is charged with a negative voltage of 150 volts d.c. to help suppress background by making the roller 19 more attractive to the developer mixture 21 than is the residual charge remaining on the exposed background areas of the web. The roller 19 is magnetized by magnet 20 so that it attracts the magnetic developer mixture 21 to its surface so that the mixture can be carried by the roller 19 and drawn into proximity with the charged areas of surface 15 of the web 10 which have a pontential greater than −150 volts d.c. The toner particles separate from the magnetic carrier particles and transfer to the charged areas of the surface 15 in amounts proportional to the strength of the electrostatic charges remaining on surface 15 to form toner images 22 corresponding to the images on the original sheet.

The toner-imaged web then continues its movement to the transfer station where the toner-imaged surface of the web is brought into contact with a succession of copy sheets 23, compressed between idler roller 24 and web transport roller 25 which have different polarities which induce transfer of the toner images 22 to the surface of the copy sheet 23.

The toner-imaged copy sheets pass through a heat-fusion zone comprising radiant heat lamps 26 and 27 which the toner composition to fuse the copy paper to form the final copies 28. The continuous master web passes from the transfer station, through a cleaning station including an exposure lamp 29 and a cleaning brush 30 and back into folded condition within the master container hopper 11 for reuse.

Figure 2:
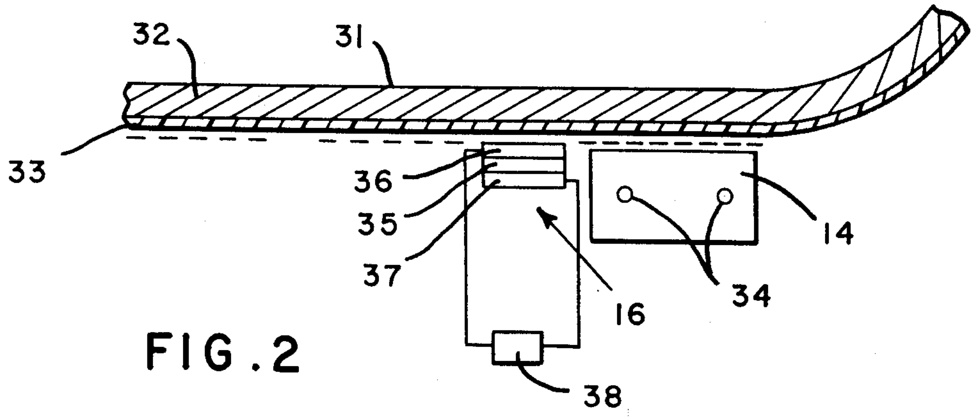
FIG. 2 is a diagrammatic cross-section, to an enlarged scale, of a portion of the photoresponsive master web of FIG. 1 illustrating the electrostatic charge received from the corona discharge device and illustrating the removal of such charge from portions of the web and the reduction of such charge from other portions of the web.

The novel effects produced by the supplemental exposure of the charged photoresponsive masters of the present invention to an energized electroluminescent element are graphically illustrated by FIG. 2 of the drawing which shows a segment of a continuous photoresponsive master 31 comprising a dielectric paper foundation 32 carrying a uniform coating 33 comprising photoresponsive composition. The web follows the path shown in FIG. 1 and passes over the electrostatic charging device 14 comprising parallel corona discharge wires 34 which extend across the width of the web and apply a uniform electrostatic charge over the entire surface of the photoresponsive coating 33. The original charge is illustrated in FIG. 2 by closely-spaced negative signs.

The charged web then passes over the electroluminescent element 16 which comprises a layer 35 of phospor composition sandwiched between electrodes 36 and 37, electrode 36 being translucent to allow the light emitted by the activated phospor layer 35 to illuminate the charged photoresponsive coating 33 of the web. Wires connect electrode layers 36 and 37 to a voltage regulator/oscillator 38 having a variable voltage and/or frequency output which ranges between no output or $V_0$, corresponding to "off" position, low output or $V_1$, which corresponds to the voltage and/or frequency required to reduce the surface potential of the photoresponsive surface to a level at which copies having a good "grey scale" and no "background" are produced, and a high output or $V_2$, which corresponds to the voltage and/or frequency required to remove or reduce the surface potential of the photoresponsive surface to the point where it has no affinity for the toner.

Figure 3:
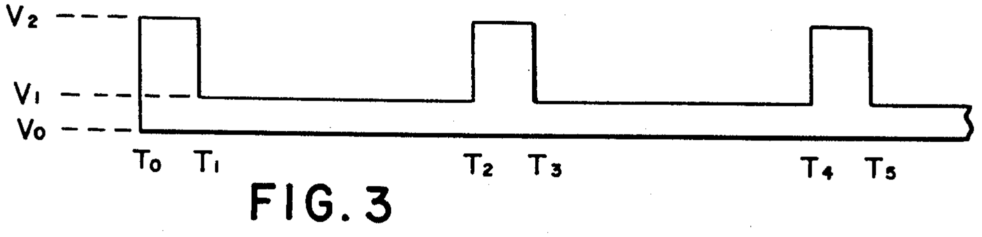
FIG. 3 is a time-amplitude graph illustrating the timed sequence of applications of alternating current of different amplitudes to the electroluminescent element of the apparatus of FIG. 1 to remove and reduce the electrostatic charge from different lengths of the web, as illustrated by FIG. 2.

Referring to FIG. 3 of the drawing, the voltage regulator/oscillator 38 of FIG. 2 is associated with a timer mechanism which is pre-set by the operator so that the periods of time $t_1$ to $t_2$ and $t_3$ to $t_4$, etc., correspond to the length of the original sheet being copied, i.e., the length of time required for the master web to move a distance corresponding to the length of the web which is exposed to the reflection 17. The value of $V_1$ is also adjusted by the operator to correspond to the degree of sensitivity of the master web, and in some cases $V_1$ may equal $V_0$, i.e., no voltage, where the photoresponse properties of the master web are satisfactory without interference.

Thus, as shown by FIG. 2, the coating 33 receives a full electrostatic charge from the corona device 14 and passes under and in close proximity to, i.e., within less than ½ inch and preferably as close as about ⅛ to ¼ inch of the surface of the electroluminescent element 16 which is initially energized from a voltage of $V_0$ to a voltage of $V_2$ in order for the element 16 to function as an interdocument charge-erasure element.

For example, using an electroluminescent element which is rated at 240 V at 60 Hz or 60 cycles per second, the regulator/oscillator element 38 energizes the electrode layers 36 and 37 at a voltage of 150 V or more at a frequency of 500 Hz with less than one watt to create the $V_2$ condition in the electroluminescent layer 35, causing the latter to glow with sufficient intensity that it dissipates the electrostatic charges on the photoresponsive coating 33 of the master web to the extent that charges capable of attracting toner composition are completely removed, as illustrated by the absence of negative signs in such areas as shown in FIG. 2 of the drawing.

The $V_2$ condition is retained for a momentary time in the interdocument areas, i.e., for periods of $t_0$-$t_1$, $t_2$-$t_3$, $t_4$-$t_5$, etc., changing instantly to a $V_1$ condition in response to timed changes in the voltage and/or frequency as provided by the regulator/oscillator 38 to reduce the electrostatic charge on the longer areas of the photoresponsive coating 33 of the web 10 which will be exposed to the reflection 17 of the original sheets being copied. For example, the regulator/oscillator element 38 is automatically adjusted to emit a voltage of less than 150 V at a frequency of 60 Hz during periods $t_1$-$t_2$, $t_3$-$t_4$, $t_5$-, etc., to instantaneously reduce the intensity of the light emitted by the electroluminescent element to the point at which the electrostatic charges present in the photoresponsive coating 33 of the master web 10 are slightly dissipated and reduced, decreasing the surface potential of the photoresponsive surface and leaving uniform, less-intense electrostatic charges present thereon in the intended copy areas, as illustrated by the greater spacing of the negative signs in such areas in FIG. 2 of the drawing.

As discussed supra, the reduction of the surface potential of the photoresponsive surface of the master reduces the tendency of said surface to attract the magnetic carrier particles from the developer composition during development of the latent electrostatic images on said surface. This reduces the problem of iron carry-out and the consequent problems of reduced image quality, damage to the master surface and machine wear.

The regulator/oscillator 38 preferably is adjustable by the machine operator in response to unsatisfactory copies being produced, evidencing the presence of a master web having unsatisfactory photoresponse. Thus, control means may be present to enable the operator to vary the level of $V_1$ until copies having a good grey scale and freedom from background are obtained.

The timing sequence of operation of the regulator/oscillator 38 preferably is built into the copying machine and is synchronized with the speed of movement of the web 10 and the length of the interdocument areas or areas which are not exposed to the flash reflection 17 of the original sheet.

The electroluminescent elements used according to the present invention are similar to those which are commercially-available for a variety of end uses from companies such as Grimes Manufacturing Company, Urbana, Ohio. Such elements comprise a layer of a phospor composition sandwiched between two electrodes, one of which electrodes is translucent to allow the luminescence of the phospor layer to pass therethrough when the electrodes are connected to a source of alternating current. The degree of luminescence or the intensity of the light emitted by the phospor layer may be increased by increasing the voltage and/or the frequency applied to the electrodes. Electroluminescent elements of this type are commercially-available for use as instrument panels, emergency exit lights, night lights, interior signs, etc. The present elements are custommade as thin strips having a length of about one-sixteenth of an inch. The length must be sufficient to extend fully across the width of the photoresponsive web, belt or drum and the width of the element may be varied so long as the required intensity of luminescence can be emitted thereby. In general, the electroluminescent element must be capable of emitting a sufficient light intensity when activated by the $V_2$ energy in order to dissipate the electrostatic charge on the photoresponsive surface to the point that said surface has no affinity for the toner powder. Such light intensity requirements will vary depending upon the surface potential of the master and its speed of movement. For the present coated master webs, moving at a speed of about 10 inches per second, the preferred light intensity is about 15 foot-lamberts. Such elements are also capable of emitting light having variable lower intensity when energized by lower voltages and/or frequencies to provide the required lower light intensity under $V_1$ activation, to diminish the strength of the electrostatic charge on the photoresponsive surface and thereby uniformly increase its speed of photoresponse in the areas of the master coating which are to be exposed to the light reflection of the imaged original sheet.

It should be understood that the present invention contemplates the use of the present solid state, instant response electroluminescent elements as either inter-document charge-eraser elements or as photoresponse compensator elements or as combinations thereof. In the former case, the electroluminescent element will be energized by timed $V_2$ pulses spaced by timed $V_0$ pulses. Where the electroluminescent element is to function solely as a photresponse compensator, the electroluminescent element will be continuously energized by a $V_1$ voltage/frequency to emit the light intensity required to uniformly diminish the electrostatic charge on the master coating and thereby increase its spread of photoresponse while retaining on the master coating an electrostatic charge of sufficient intensity to function perfectly in the electrostatic copying process.

Variations and modifications of the present process and apparatus will be apparent to those skilled in the art in the light of the present disclosure and within the scope of the appended claims.

We claim:

1. In a process of controlling the intensity of charges on a photoresponsive surface of a photoconductive insulating master, comprising:

(a) charging the photoresponsive surface to a first potential;

(b) exposing the photoconductor to an electroluminescent element to reduce the charge on the photoconductor to a second potential;

(c) creating a latent image of an original document on the photoresponsive surface by exposing the photoresponsive surface to an exposure station;

(d) developing the latent image;

(e) transferring the developed image to a copy sheet;

(f) and adjusting the output of the electroluminescent element in response to the gray scale and background produced on the copy sheet; and (g) repeating steps a–e.

2. A process according to claim 1 in which said electroluminescent element is energized to emit light of sufficient intensity to dissipate the electrostatic charges and reduce the surface potential of a portion of said photoresponsive surface to the extent that such portion of said surface is no longer photoresponsive.

3. A process according to claim 1 in which said electroluminescent element is variably energized to emit light of different intensities over different portions of the photoconductive insulating master, some portions of the photoresponsive surface of the master which are not to be exposed to the said light image being exposed to intense light from the electroluminescent element to render said portions no longer photoresponsive, and other portions of the photoresponsive surface of the master which are to be exposed to the said light image being exposed to less intense light from the electroluminescent element to reduce the surface potential of said portions and increase the speed of photoresponse thereof.

4. A process according to claim 3 in which said electroluminescent element is energized by applying voltage thereto and the intensity of the light emitted thereby is varied by varying the amount of voltage applied thereto.

5. A process according to claim 3 in which said electroluminescent element is energized by applying voltage thereto and the intensity of the light emitted thereby is varied by varying the frequency of the current applied thereto.

6. A process according to claim 1 in which the photoconductive insulating master is a continuous master web carrying a coating comprising the photoresponsive surface thereof.

7. A process according to claim 6 in which the continuous master web is uniformly sensitized by application of a continuous field of electrostatic charges to the photoresponsive surface thereof, spaced portions of said sensitized web are exposed to said electroluminescent element energized to emit sufficient light to cause the complete removal of the electrostatic charges from said spaced portions of the web to render said portions no longer photosensitive, and the areas of said sensitized web between said spaced portions are exposed to the said light image.

8. A process according to claim 1 in which said luminescent element comprises a thin strip of phospor composition sandwiched between two electrode layers, one of said electrode layers being translucent to permit the light emitted from said phospor layer to illuminate the photoresponsive surface of the master.

9. A process according to claim 8 in which the continuous master web is uniformly sensitized by application of a continuous field of electrostatic charges to the photoresponsive surface thereof, spaced portions of said sensitized web are exposed to said electroluminescent element energized to emit sufficient light to cause complete removal of the electrostatic charges from said spaced portions of the web to render said portions no longer photosensitive, spaced areas of said sensitized web between said spaced portions are exposed to said electroluminescent element energized to emit a lesser amount of light which is sufficient to lower the surface potential of the photoresponsive surface and increase its speed of photoresponse, and said spaced areas of said sensitized web are exposed to said illuminated imaged original sheet.

* * * * *

UNITED STATES PATENT AND TRADEMARK OFFICE

CERTIFICATE OF CORRECTION

PATENT NO. : 4,264,201

DATED : April 28, 1981

INVENTOR(S) : Harold M. Stahl

It is certified that error appears in the above—identified patent and that said Letters Patent is hereby corrected as shown below:

Column 2, line 8 change "illumnated" to -- illuminated --.
Column 3, line 29 change "responsive" to -- response --.
Column 4, line 16 change "proimity" to -- proximity --.
Column 4, line 45 change "power" to -- powder --.
Column 4, line 57 change "pontential" to -- potential --.
Column 5, lines 28 and 30 change "phospor" to -- phosphor --.
Column 6, lines 58, 60 and 63 change "phospor" to -- phosphor --.
Column 8, lines 44 and 47 change "phospor" to -- phosphor --.
Column 7, line 33 change "photresponse" to -- photoresponse --.

Signed and Sealed this

*Twenty-seventh* Day of *October 1981*

[SEAL]

*Attest:*

GERALD J. MOSSINGHOFF

*Attesting Officer* *Commissioner of Patents and Trademarks*